(12) United States Patent
Schuck

(10) Patent No.: US 9,422,014 B1
(45) Date of Patent: Aug. 23, 2016

(54) AXLE LIFT SYSTEM AND METHOD OF CONTROL

(71) Applicant: ArvinMeritor Technology, LLC, Troy, MI (US)

(72) Inventor: Luis Gustavo Schuck, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/630,724

(22) Filed: Feb. 25, 2015

(51) Int. Cl.
*B62D 61/12* (2006.01)
*B60G 5/00* (2006.01)

(52) U.S. Cl.
CPC *B62D 61/12* (2013.01); *B60G 5/00* (2013.01); *B62D 61/125* (2013.01); *B60G 2204/4702* (2013.01); *B60G 2600/20* (2013.01); *B60G 2800/915* (2013.01)

(58) Field of Classification Search
CPC ............... B62D 61/125; B62D 61/12; B60G 2204/4702; B60G 2204/47; B60G 2300/402; B60G 2800/915
USPC ................................ 280/86.5; 180/209, 24.02
See application file for complete search history.

(56) References Cited

U.S. PATENT DOCUMENTS

| | | | | |
|---|---|---|---|---|
| 3,096,995 A | * | 7/1963 | Richnow, Jr. | B60G 5/047 180/22 |
| 5,192,101 A | * | 3/1993 | Richardson | B60G 11/26 180/209 |
| 8,641,062 B2 | | 2/2014 | Gottschalk | |
| 8,695,998 B1 | | 4/2014 | Karel et al. | |
| 2004/0084859 A1 | * | 5/2004 | Petzold | B62D 61/125 680/6.153 |
| 2014/0210174 A1 | | 7/2014 | Conaway et al. | |

FOREIGN PATENT DOCUMENTS

| | | | | |
|---|---|---|---|---|
| DE | EP 0120332 A1 | * | 10/1984 | B62D 61/12 |
| DE | EP 0561366 A1 | * | 9/1993 | B60G 17/005 |
| DE | 4231098 A1 | * | 3/1994 | B60R 19/56 |
| DE | 4445612 A1 | * | 7/1995 | B60G 5/04 |

OTHER PUBLICATIONS

Meritor Heavy Vehicle Systems, LLC, "Meritor Trailer Products," copyright 2012, Meritor, Inc., Troy, Michigan.

\* cited by examiner

*Primary Examiner* — Keith Frisby
(74) *Attorney, Agent, or Firm* — Brooks Kushman P.C.

(57) ABSTRACT

An axle lift system and a method of control. The axle lift system may include a liftable axle assembly and an axle securing unit. The axle securing unit may selectively secure the liftable axle assembly in a secured position in which the tires of the liftable axle assembly may not support the vehicle.

15 Claims, 7 Drawing Sheets

AXLE LIFT SYSTEM AND METHOD OF CONTROL

TECHNICAL FIELD

This patent application relates to an axle lift system and a method of control.

BACKGROUND

An axle lift assembly is disclosed in U.S. Pat. No. 8,695,998.

SUMMARY

In at least one embodiment, a method of controlling an axle lift system for a vehicle is provided. A first axle assembly may have a first tire and may be coupled to a chassis via a first suspension unit. A second axle assembly may have a second tire and may be coupled to the chassis via a second suspension unit. The first suspension unit and the second suspension unit may be refracted to lower the chassis. The second axle assembly may be held in a secured position with an axle securing unit. The first suspension unit may be extended to raise the chassis such that the second tire does not support the vehicle.

In at least one embodiment, a method of controlling an axle lift system for a vehicle is provided. The method may include retracting the first suspension unit to lower the chassis, releasing the axle securing unit from a second axle assembly, and extending first and second suspension units to raise the chassis such that first and second tires provided with the first and second axle assemblies, respectively, support the vehicle.

In at least one embodiment, an axle lift system for a vehicle is provided. The axle lift system may include a first axle assembly, a second axle assembly, and an axle securing unit. The first axle assembly may have a first tire and may be configured to be coupled to a chassis with a first suspension unit. The second axle assembly may have a second tire and may be configured to be coupled to the chassis with a second suspension unit. The axle securing unit may be disposed proximate the chassis and the second axle assembly. The axle securing unit may be actuated when the first suspension unit and the second suspension unit are retracted to lower the chassis, and the first tire and the second tire support the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
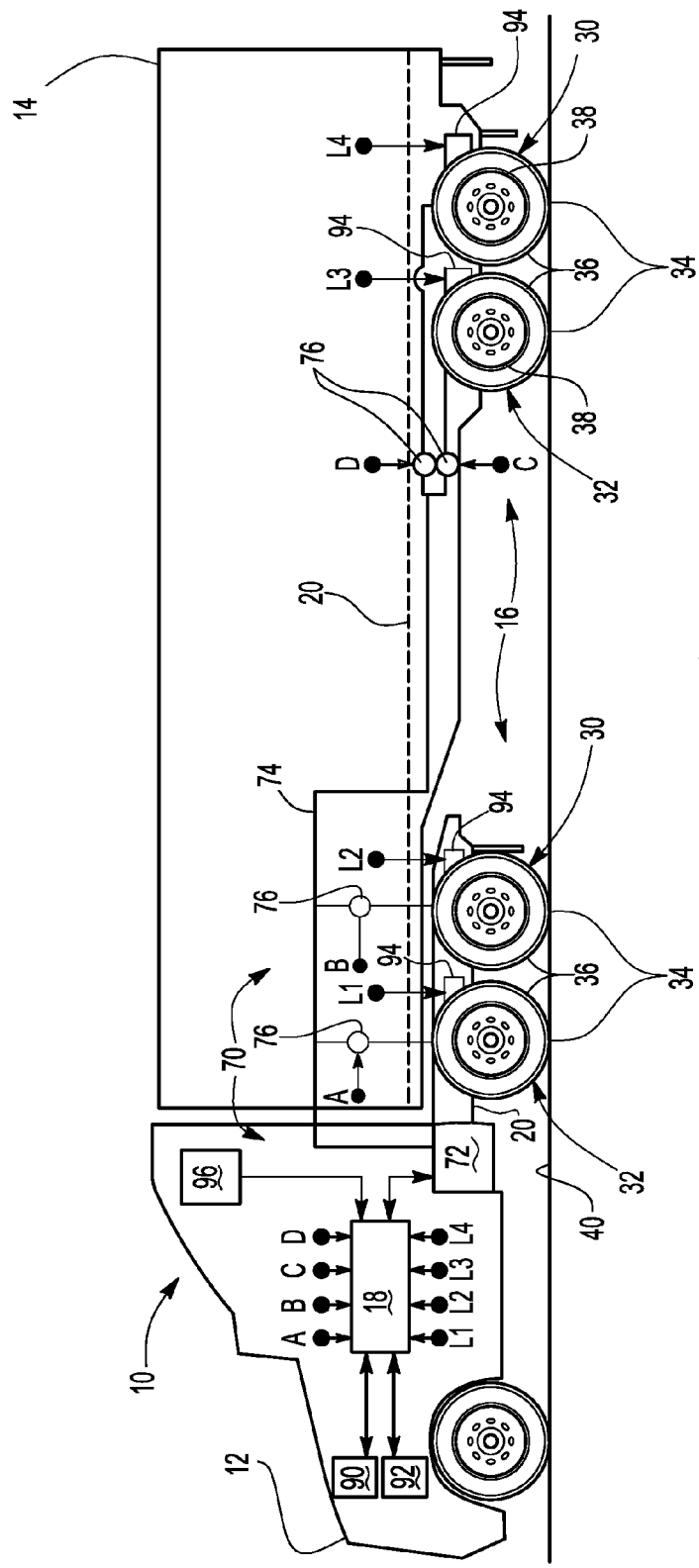
FIG. 1 is an illustration of an exemplary vehicle having an axle lift system.

Referring to FIG. 1, an exemplary vehicle 10 is shown. The vehicle 10 may be a motor vehicle that may be used to transport cargo. For example, the vehicle 10 may be configured as a truck and may include a tractor 12 and/or a trailer 14. The tractor 12 may receive a driver and may propel and steer the vehicle 10. The trailer 14 may be coupled to the tractor 12 and may be configured to receive cargo. The vehicle 10 may also have an axle lift system 16 and a control system 18.

The tractor 12 and the trailer 14 may each include a frame or chassis 20. For clarity in the text below, a common reference number is used to designate the chassis 20 of the tractor 12 and the chassis 20 of the trailer 14 in the figures, although the chassis 20 of the tractor 12 may be separate from the chassis 20 of the trailer 14.

The tractor 12 and the trailer 14 may include one or more axle assemblies. For example, the tractor 12 and/or the trailer 14 may include at least one non-liftable axle assembly 30 and a liftable axle assembly 32. The non-liftable and liftable axle assemblies 30, 32 may be disposed proximate or may be mounted to the chassis 20.

The non-liftable and liftable axle assemblies 30, 32 may each rotatably support one or more wheel assemblies 34 that may include a tire 36 that may be mounted on a wheel 38. A non-liftable axle assembly 30 may be configured such that its associated wheel assemblies 34 may be disposed on a support surface 40, like a road or the ground, during normal operation to support the vehicle 10 and facilitate movement of the vehicle 10. A non-liftable axle assembly 30 may not be held in a lifted position or a secured position by the axle lift system 16 such that its associated wheel assemblies 34 are raised or lifted from the support surface 40 toward the chassis 20 and held in the secured position such that an associated wheel assembly 34 is lifted above and does not engage the support surface 40 or support the weight of the vehicle 10. A liftable axle assembly 32 may be selectively held in a secured position by the axle lift system 16 such that its associated wheel assemblies 34 are raised or lifted from the support surface 40 toward the chassis 20 and do not engage the support surface 40 to support the weight of the vehicle 10. As such, one or more non-liftable axle assemblies 30 or axle assemblies that are not held in the secured position may support the vehicle 10 when a liftable axle assembly 32 is held in the secured position. The wheel assemblies 34 of a liftable axle assembly 32 may be disposed on the support surface 40 when they are not held in a secured position by the axle lift system 16 to support the vehicle 10 and facilitate movement of the vehicle 10.

The non-liftable axle assemblies 30 and liftable axle assemblies 32 may be provided in various quantities and locations. In FIG. 1, one non-liftable axle assembly 30 and one liftable axle assembly 32 are provided with the tractor 12 and the trailer 14, although it is contemplated that a greater number of non-liftable axle assemblies 30 and/or liftable axle assemblies 32 may be provided. In FIG. 1, a non-liftable axle assembly 30 is located to the right of each liftable axle assembly 32 from the perspective shown; however, it is contemplated that this positioning may be reversed in one or more embodiments. In addition, it is contemplated that the either the tractor 12 or the trailer 14 may not be provided with a liftable axle assembly 32 in one or more embodiments.

The non-liftable axle assemblies 30 and liftable axle assemblies 32 may be provided in different configurations. For example, a non-liftable axle assembly 30 or a liftable axle assembly 32 may or may not be configured to steer the vehicle 10. In addition, a non-liftable axle assembly 30 or a liftable axle assembly 32 and may or may not be configured as a drive axle that may provide torque to at least one wheel assembly 34 that may propel the vehicle 10.

Figure 5:
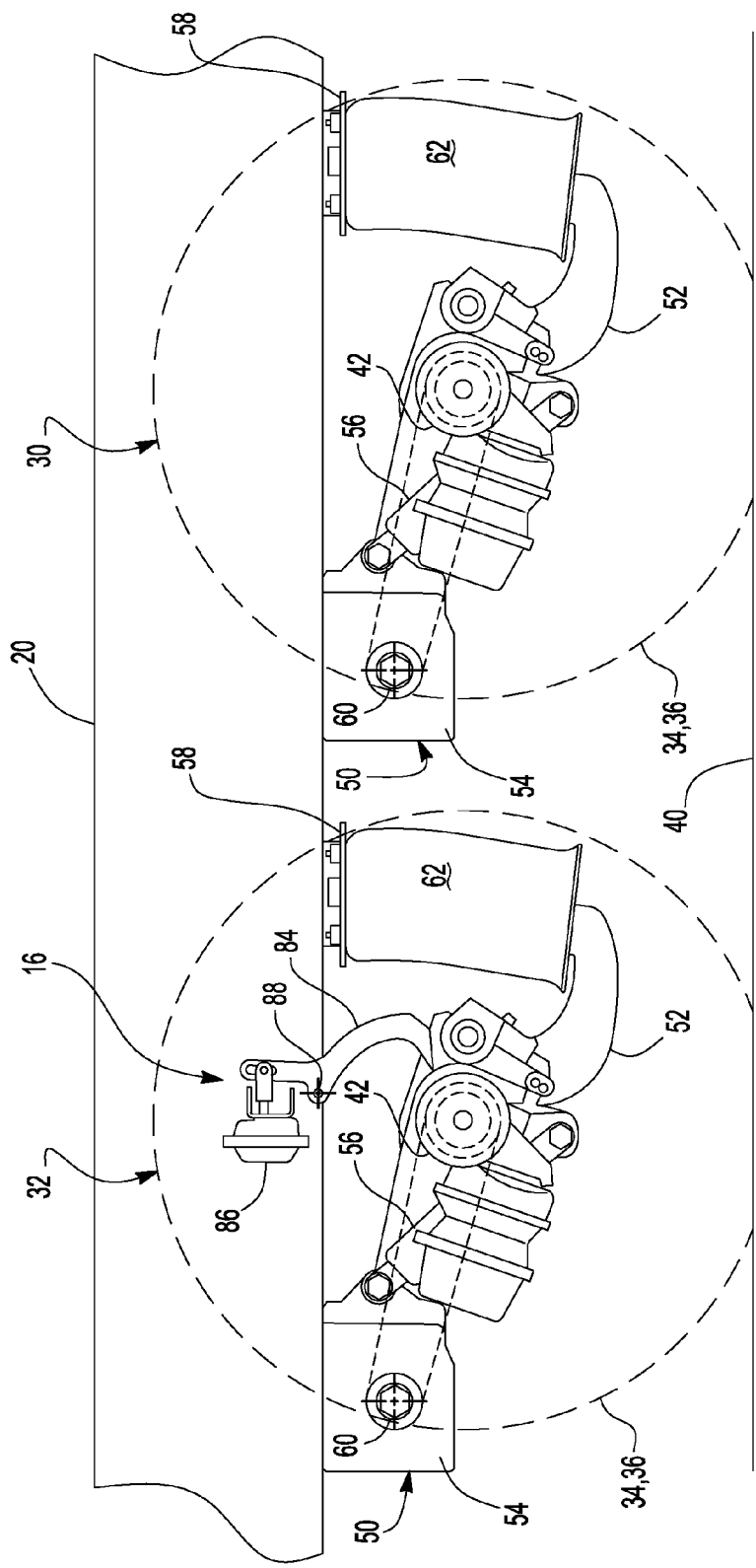
FIGS. 5-8 illustrate operation of the axle lift system.

Referring to FIG. 5, an exemplary pair of non-liftable and liftable axle assemblies 30, 32 is shown in more detail. The non-liftable and liftable axle assemblies 30, 32 may include a housing 42 that may rotatably support one or more wheel assemblies 34. In the case of a drive axle, the housing 42 may receive a differential and an axle that may provide torque to one or more wheel assemblies 34. The non-liftable and/or liftable axle assemblies 30, 32 may also include multiple axles that may each support corresponding vehicle wheels. An example of such an axle assembly is the Meritor Ride-Sentry™ MPA Series Trailer Air Suspension. Such an axle assembly may have two or more axles or axle assemblies that may be mounted on a common subframe, which may be referred to as a slider or slider assembly. The slider assembly may be mounted to the chassis 20 such that the slider assembly and move longitudinally with respect to the chassis 20 (e.g., back and forth in a direction extending from the front of the vehicle to the back of the vehicle). The axle assemblies will be described below primarily with reference to non-liftable and liftable axle assemblies that have a single axle; however, it is to be understood that multiple axle assemblies may be associated with a non-liftable axle assembly or a liftable axle assembly in one or more embodiments. As such, the axle lift system 16 may hold a liftable axle assembly that may include multiple axles that may each support different sets of wheel assemblies 34 in a secured position in which the wheel assemblies 34 are raised or lifted from the support surface 40 toward the chassis 20 and do not engage the support surface 40 to support the weight of the vehicle 10.

The non-liftable and liftable axle assemblies 30, 32 may each be coupled to or connected to the chassis 20 with an axle suspension system or suspension unit 50. The suspension unit 50 and may dampen vibrations, provide a desired level of ride quality, and control ride height or the distance between the chassis 20 and the support surface 40. In addition, the suspension unit 50 may be part of the axle lift system 16 or may cooperate with the axle lift system 16 to raise and lower the chassis 20 with respect to the support surface 40 so that a liftable axle assembly 32 may be secured or released. The suspension unit 50 may be configured as an air suspension unit or an air ride suspension unit that may employ air springs or air bellows that receive a pressurized gas as will be discussed in more detail below. As such, the suspension unit 50 may raise or lower the chassis 20 by inflating or deflating one or more air springs. The suspension unit 50 may be provided in various configurations. For example, the suspension unit 50 may include a suspension arm 52, a hanger 54, a shock absorber 56, and an air spring 58.

The suspension arm 52 may extend from the axle assembly 30, 32 and may be fixedly positioned with respect to the axle assembly 30, 32. For example, at least one suspension arm 52 may be fixedly positioned on or with respect to the housing 42. It is contemplated that the suspension unit 50 may be provided without a suspension arm in one or more embodiments.

The hanger 54 may be fixedly disposed or fixedly positioned with respect to the chassis 20. For instance, a top surface of the hanger 54 may be mounted to the chassis 20. The suspension arm 52 may be pivotally coupled to the hanger 54. For example, the suspension arm 52 may be pivotally coupled to the hanger 54 with a pivot pin 60 that may extend through the hanger 54 and the suspension arm 52. As such, the suspension arm 52 may pivot about the pivot pin 60 and may pivot with respect to the hanger 54.

The shock absorber 56 may be provided to dampen shock impulses and dissipate kinetic energy. The shock absorber 56 may be mounted to the hanger 54 at a first end and to the suspension arm 52 at a second end.

An air spring 58 may be disposed proximate the suspension arm 52. For example, the air spring 58 may be disposed proximate an end of the suspension arm 52 that may be disposed opposite the hanger 54. The air spring 58 may support the chassis 20. For instance, the air spring 58 may be disposed above an associated axle assembly 30, 32 and under the chassis 20. The air spring 58 may have a flexible bellows 62 that may at least partially define a chamber within the air spring 58 that may receive pressurized gas from a pressurized gas supply system 70. Providing pressurized gas to one or more air springs 58 may extend a corresponding suspension unit 50 or move the suspension unit 50 toward an extended position and may raise or lift the chassis 20 away from the support surface 40. Venting pressurized gas from one or more air springs 58 may retract a corresponding suspension unit 50 or move the suspension unit 50 toward a retracted position and may lower the chassis 20 toward the support surface 40.

Referring to FIG. 1, the pressurized gas supply system 70 may provide a pressurized gas or pressurized gas mixture, such as air, to the air spring 58. The term pressurized gas is used to generically reference a single gas or a gas mixture, such as air, that may be pressurized above atmospheric pressure by the pressurized gas supply system 70. As is best shown in FIG. 1, the pressurized gas supply system 70 may include a pressurized gas source 72, one or more conduits 74, and one or more valves 76.

The pressurized gas source 72 may include a tank or reservoir that contains a volume of pressurized gas and/or a pump or compressor that provides pressurized gas.

A conduit 74 may fluidly connect the pressurized gas source 72 to an air spring 58. A conduit 74 may have any suitable configuration, such as a hose, tubing, pipe, or combinations thereof.

One or more valves 76 may be provided to control the flow of pressurized gas to and/or from an air spring 58. For example, at least one valve 76 may enable or disable the flow of pressurized gas from the pressurized gas source 72 to at least one air spring 58. The valve 76 may have any suitable configuration and may be actuated in any suitable manner, such as with a solenoid. In FIG. 1, a single valve 76 is associated with the air springs 58 of each axle assembly 30, 32; however, a different number of valves 76 or different valve configuration may be employed. For instance, a valve 76 may be associated with each individual air spring 58 or a single valve 76 may be associated with multiple axle assemblies 30, 32. In addition, it is contemplated that a common valve 76 may provide inflation and venting functionality or that separate valves 76 may be provided to control inflation and venting of an air spring 58. An air spring 58 may be inflated by opening an associated valve 76 to provide pressurized gas from the pressurized gas source 72 to the air spring 58. In addition, the valve 76 may enable or disable venting or the exhaust of pressurized gas from the air spring 58. The air spring 58 may be deflated by positioning the valve 76 such that pressurized gas is vented or exhausted from the air spring 58, such as by venting pressurized gas to the surrounding environment.

Figure 2:
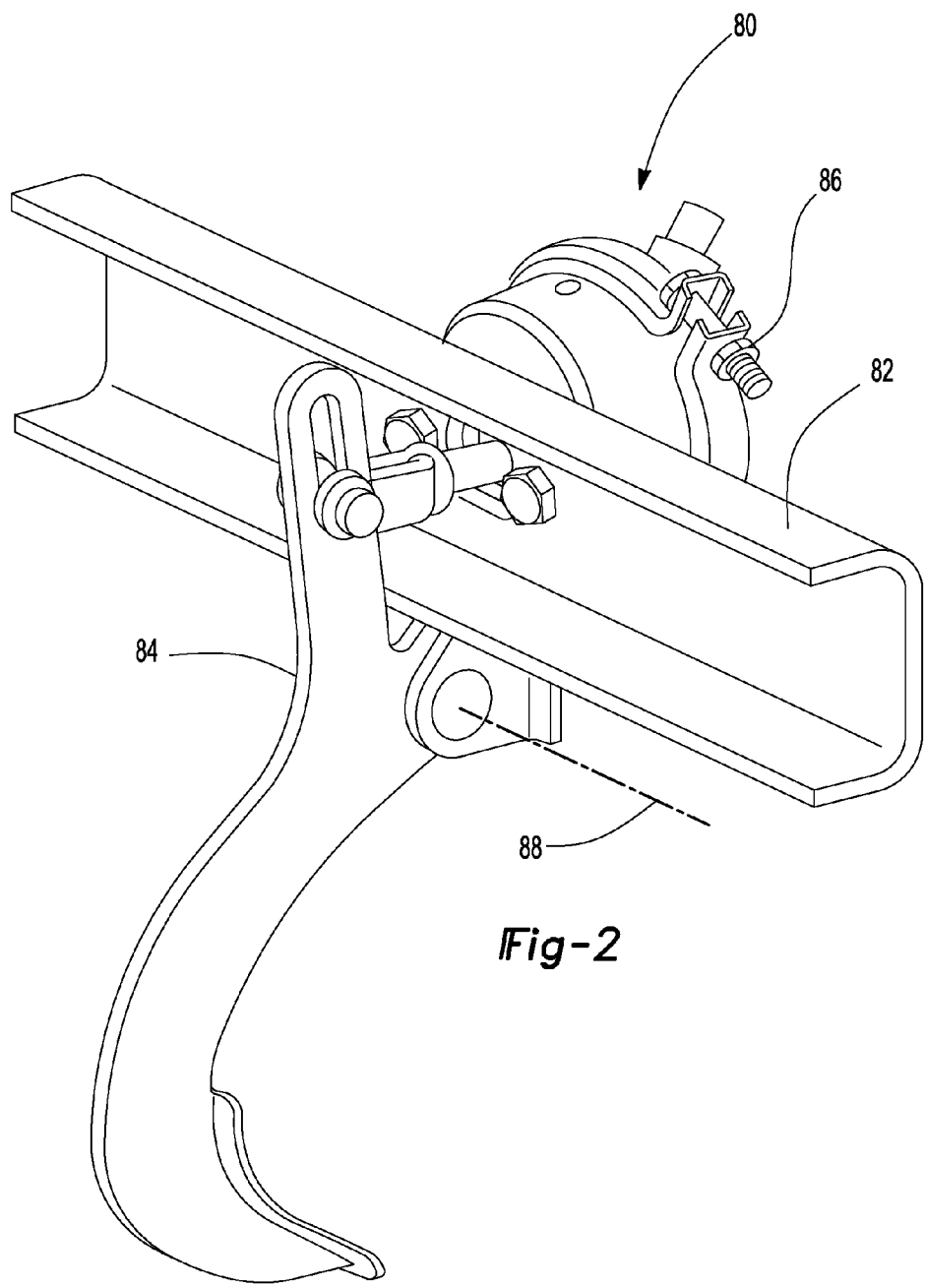
FIG. 2 is a perspective view of an axle securing unit that may be provided with the axle lift system.

Referring to FIGS. 2 and 5, the axle lift system 16 may include an axle securing unit 80. The axle securing unit 80 may be associated with or may be provided with a liftable axle assembly 32, but may not be provided with a non-liftable axle assembly 30. The axle securing unit 80 may be disposed proximate the chassis 20. For example, the axle securing unit 80 may be disposed on a cross member 82 that may be fixedly positioned on or with respect to the chassis 20. The axle securing unit 80 may include a hook 84 and an actuator 86.

Figure 6:
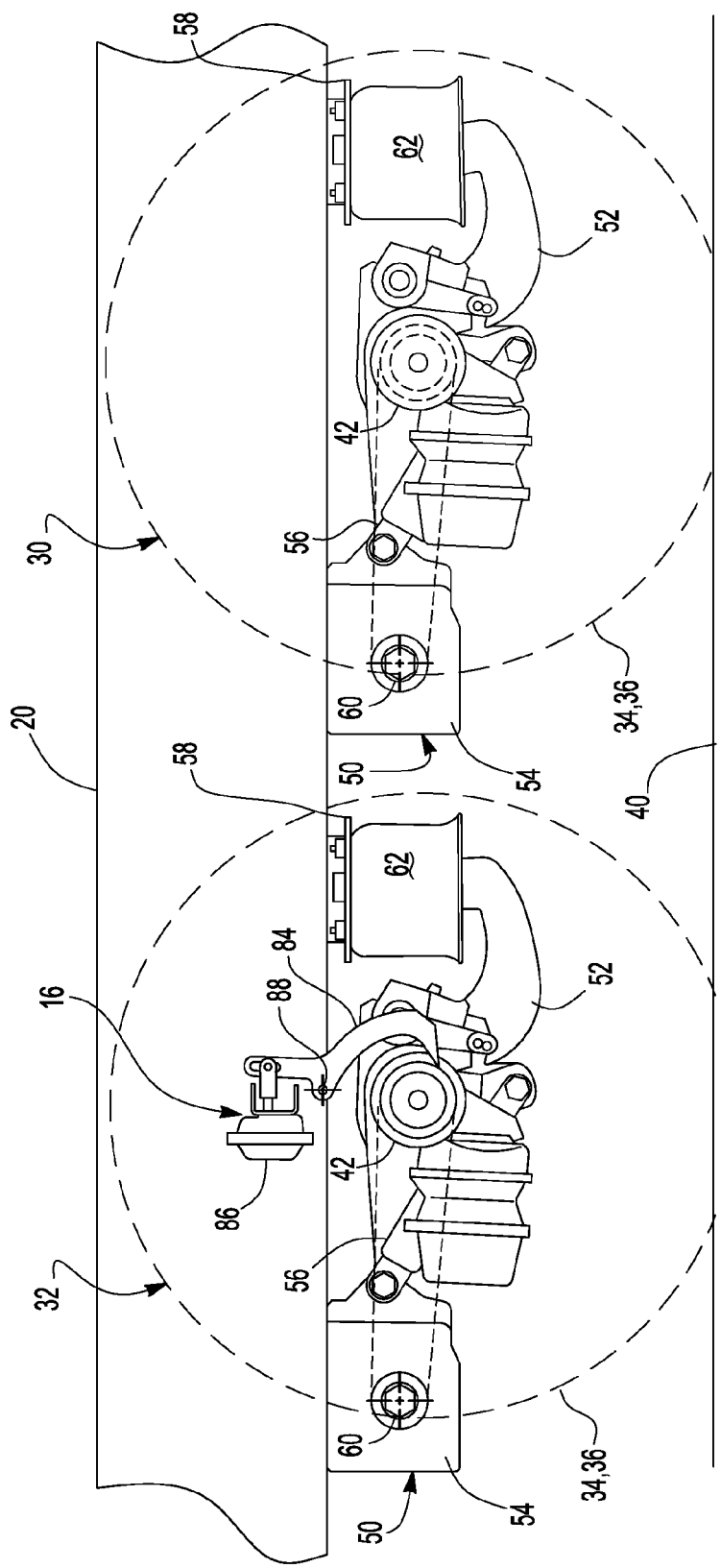
Figure 7:
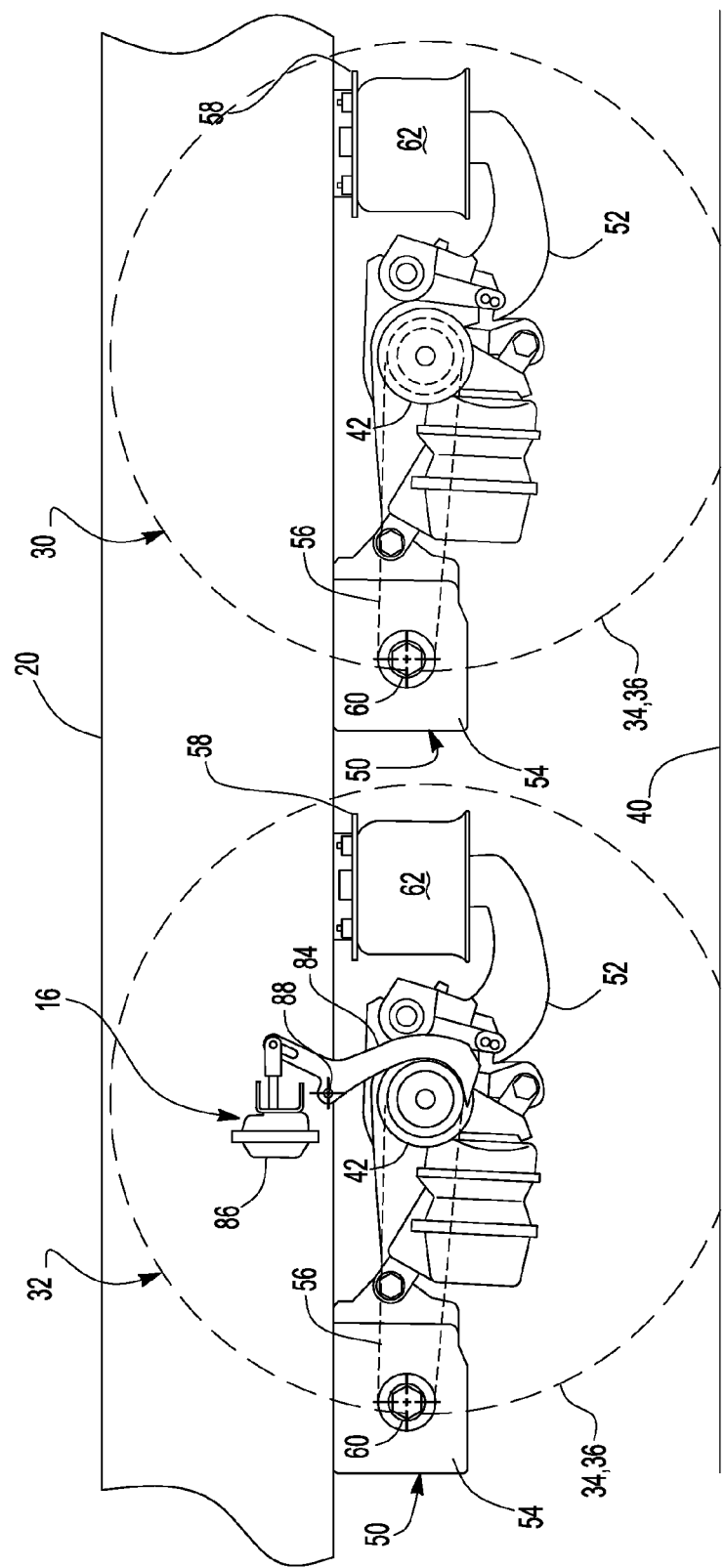
Figure 8:
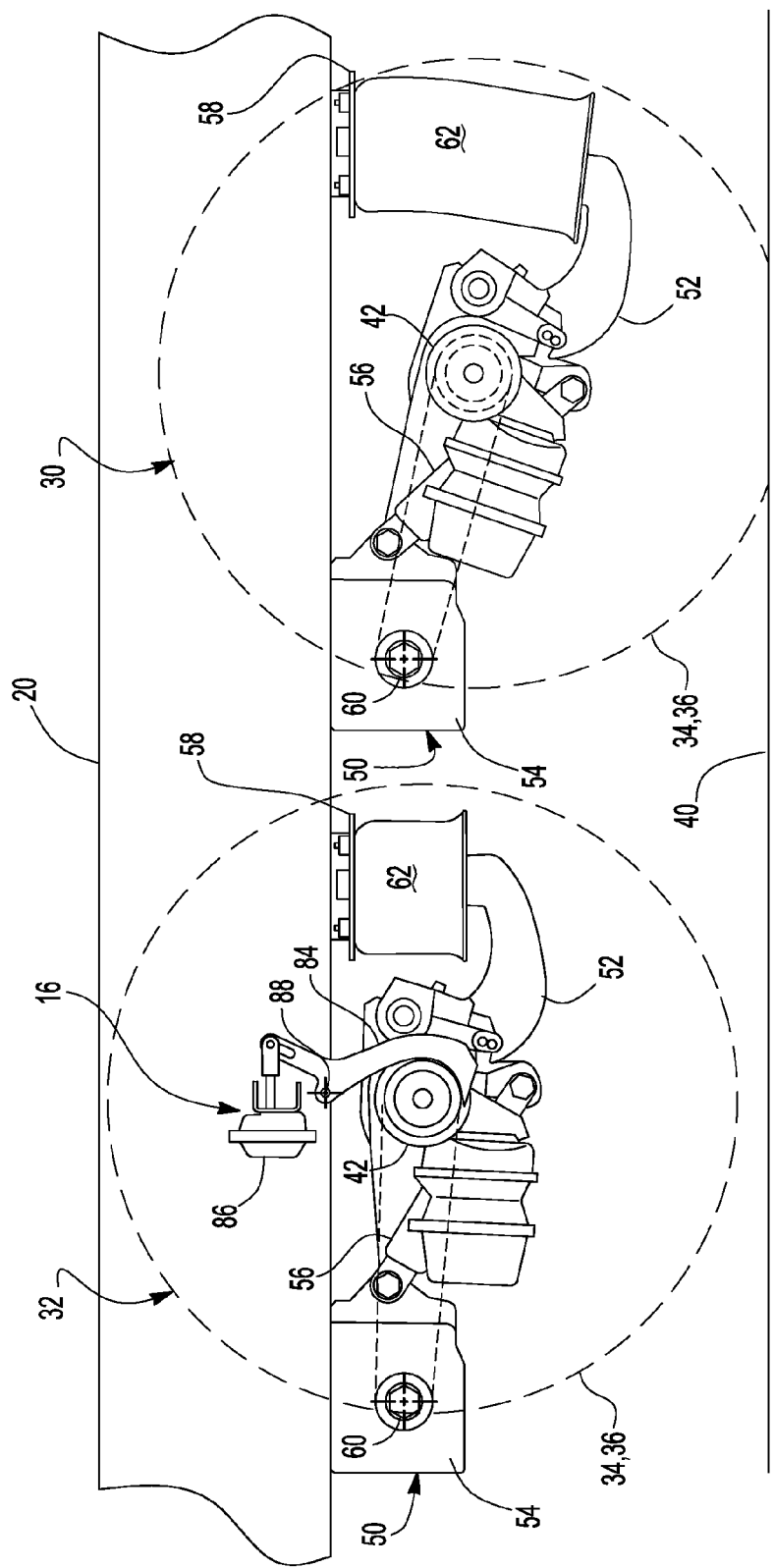

The hook 84 may be configured to secure an associated axle assembly in a secured position. The hook 84 may be configured move with respect to the chassis 20 and/or the cross member 82. For example, the hook 84 may be movably disposed on the cross member 82 with a mounting bracket and may be configured to engage and receive the liftable axle assembly 32. The hook 84 may be configured to move between a first position, which may also be called a released position, and a second position, which may also be called a secured position. The hook 84 may be disengaged from a liftable axle assembly 32 when in the released position as is shown in FIGS. 5 and 6. As such, movement of the liftable axle assembly 32 may be limited by the suspension unit 50, but not the axle securing unit 80 when the hook 84 is in the released position. The hook 84 may engage or receive the liftable axle assembly 32 when in a secured position, such as is shown in FIGS. 7 and 8. As such, movement of the liftable axle assembly 32 may be limited by axle securing unit 80 when the hook 84 is in the secured position. For example, the axle securing unit 80 may inhibit or limit movement of the liftable axle assembly 32 away from the chassis 20 or toward the support surface 40 when in the secured position. Thus, the liftable axle assembly 32 may be free to move further away from the chassis 20 when the hook 84 is in the released position as compared to the secured position. The hook 84 may move in any suitable manner. For example, the hook 84 may be configured to move linearly or rotate or pivot about a pivot axis 88.

The actuator 86 may be configured to move or actuate the hook 84 between the released position and the secured position. The actuator 86 may be of any suitable type, such as a pneumatic, hydraulic, electrical, or electromechanical actuator. In at least one embodiment, the actuator 86 may include an actuator shaft that may be operatively connected to the hook 84. In the embodiment shown in FIG. 2, the actuator shaft extends through a hole in the cross member 82.

The axle securing unit 80 may not include an actuator that lifts an axle assembly toward the chassis 20. As such, the axle lift system 16 described herein may be smaller, lighter, less expensive, easier to package, and easier to install than an axle lift assembly that has an actuator that lifts a heavy axle assembly toward the chassis rather than lowering the chassis toward the support surface 40 prior to securing or releasing an axle assembly.

Referring to FIG. 1, the control system 18 may monitor and control operation of components and systems of the vehicle 10. The control system 18 may include at least one microprocessor-based controller or control module that may monitor and/or control various components or systems of the vehicle 10, such as the axle lift system 16 and/or the pressurized gas supply system 70. For example, the control system 18 may be configured to control the operation of the valves 76 to control the flow of pressurized gas to the air spring 58 and to control venting of pressurized gas from the air spring 58. The connection or communication between the control system 18 and the valves 76 is represented with connection nodes A, B, C and D.

The control system 18 may also communicate with various sensors or input devices. For instance, the control system 18 may be configured to receive a signal or data from a speed sensor 90, a gear selector sensor 92, a load sensor 94, and an operator communication device 96.

The speed sensor 90 may be configured to detect or provide data indicative of the speed of the vehicle 10. For example, the speed sensor 90 may detect the rotational speed of a drivetrain component or a wheel assembly 34. The speed sensor 90 may be of any suitable type and may provide data indicative of whether the vehicle 10 is stationary or moving.

The gear selector sensor 92 may be configured to detect or provide data indicative of the selection of a transmission gear ratio or whether a transmission drive gear has not been selected or engaged (e.g., the transmission is in a neutral or park position). As such, the gear selector sensor 92 may provide data that may be indicative of whether the vehicle 10 is stationary (e.g., a neutral or park position is selected). A gear selector sensor 92 may be associated with a gearshift lever or similar operator input device for selection of a transmission gear ratio.

One or more load sensors 94 may be provided to detect or provide data indicative of axle load and/or vehicle load. The load sensor 94 may be of any suitable type. For example, the load sensor 94 may include one or more physical sensors that may be disposed on the vehicle 10 that may detect or provide data indicative of the pressure of pressurized gas that is disposed in or supplied to an air spring 58. As such, axle load or vehicle load may be based on data indicative of pressure in an air spring 58. A load sensor 94 may be associated with or provided with one or more non-liftable axle assemblies 30 or with one or more non-liftable axle assemblies 30 and one or more liftable axle assemblies 32. Alternatively, the load sensor 94 may be a virtual sensor that may receive vehicle load data that may be wirelessly transmitted to the vehicle 10, such as from a scale that may be equipped with suitable communication equipment. Communication between the control system 18 and each load sensor 94 is represented by connection nodes L1 through L4 in FIG. 1.

The operator communication device 96 may be provided to receive an input from an operator or an operator command. The operator communication device 96 may be of any suitable type or types, such as a switch, button, sensor, display, touchscreen, keypad, voice command or speech recognition system, or the like. The operator communication device 96 may be used to input data that may not be predetermined or provided by a sensor or other input device, such as may be the case when a vehicle 10 is not equipped with one or more of the sensors discussed herein. In addition, the operator communication device 96 may be used to allow manual entry of vehicle load data and/or a command to lift and secure or lower and release one or more liftable axle assemblies 32. It is also contemplated that the operator communication device 96 may provide a warning message when the operator attempts to secure or release a liftable axle assembly 32 under conditions that fall outside of target axle load levels or predetermined operating parameters.

Figures 3, 4:
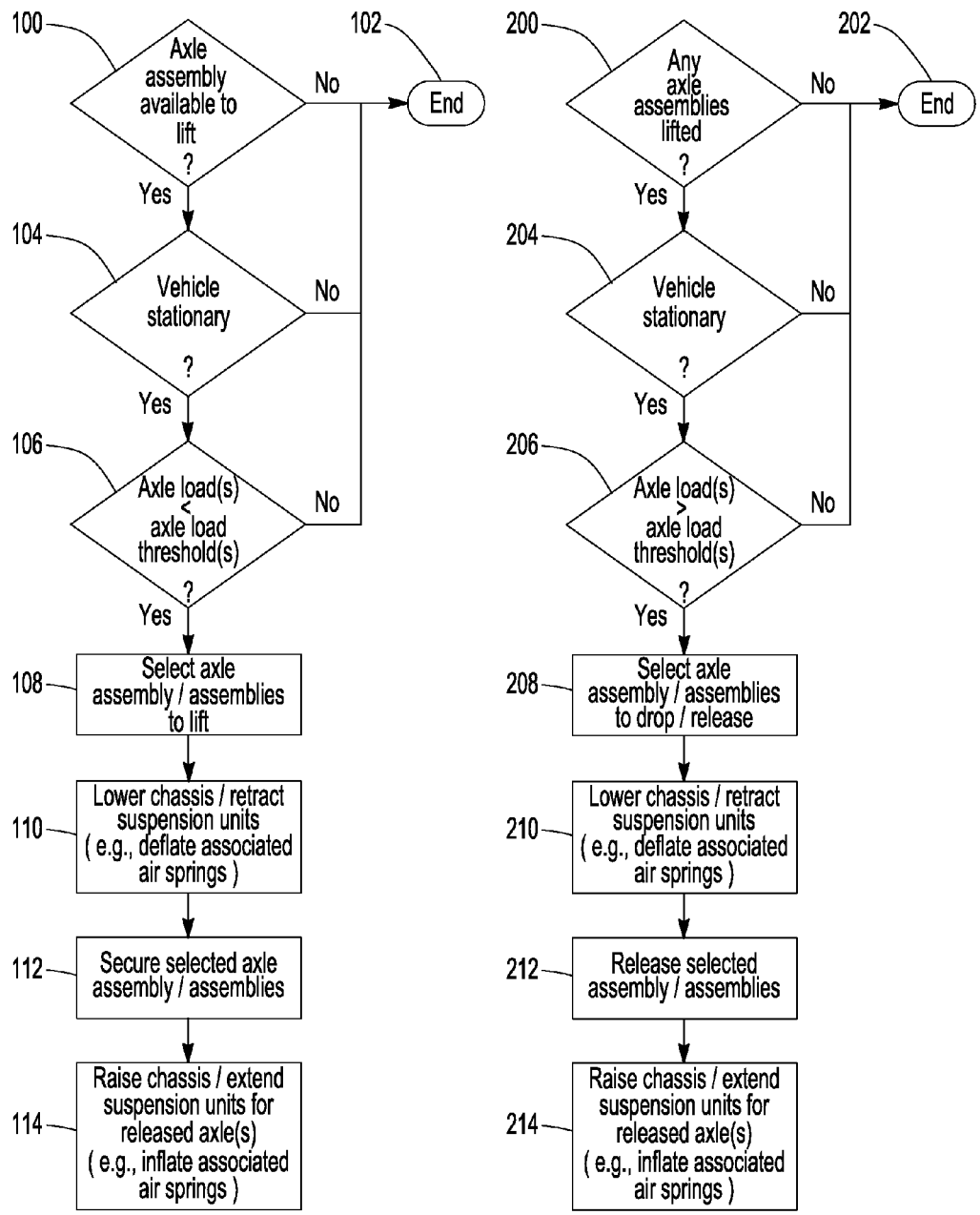
FIGS. 3 and 4 are flowcharts associated with a method of controlling an axle lift system.

Referring to FIG. 3, a flowchart of an exemplary method of controlling an axle lift system is shown. The method may be used to inflate or deflate one or more air springs to extend or retract one or more suspension units to facilitate securing and lifting of one or more liftable axle assemblies and/or releasing one or more liftable axle assemblies so that its associated wheel assemblies may engage the support surface and support the vehicle. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope intended.

Referring to FIG. 3, a flowchart is shown that illustrates steps associated with lifting a liftable axle assembly 32 and holding the liftable axle assembly 32 in a secured position with the axle securing unit 80. FIGS. 5-8 are provided to help illustrate associated method steps. For simplicity, FIGS. 5-8 illustrate the method in the context of a vehicle 10 that has one non-liftable axle assembly 30 and one liftable axle assembly 32. For illustration purposes, the method will be described beginning with the vehicle 10 in an initial configuration shown in FIG. 5 in which liftable axle assembly 32 is released and not secured by the axle lift system 16 with the tires 36 of the non-liftable axle assembly 30 and the liftable axle assembly 32 disposed on the support surface 40 such that the non-liftable axle assembly 30 and the liftable axle assembly 32 support the chassis 20.

At block 100, the method may determine whether any liftable axle assemblies 32 are available to lift. A liftable axle assembly 32 may be available to lift when it is not held in a secured position with an associated axle securing unit 80. As such, a tire 36 of a liftable axle assembly 32 may be disposed on the support surface 40 and the hook 84 of the axle securing unit 80 may be disengaged from the liftable axle assembly 32. A determination as to whether a liftable axle assembly 32 is available to lift may be based on data associated with the axle securing unit 80, such as whether the hook 84 is in the secured position or the actuator 86 has been actuated to move the hook 84 to the secured position. Alternatively or in addition, a determination as to whether a liftable axle assembly 32 is available to lift may be based on data from an associated load sensor 94. For instance, a liftable axle assembly 32 may not be available to lift when a corresponding axle load is not detected (i.e., no axle load may be detected when a liftable axle assembly 32 is secured with an associated axle securing unit 80 and the liftable axle assembly 32 does not support the vehicle 10). If a liftable axle assembly is not available to lift (e.g., all liftable axle assemblies 32 are secured by an associated axle securing unit 80), then the method or iteration of the method may end at block 102. If a liftable axle assembly is available to lift (e.g., at least one liftable axle assembly 32 is not secured by an associated axle securing unit 80), then the method may continue at block 104.

At block 104, the method may determine whether the vehicle 10 is stationary. A determination as to whether the vehicle 10 is stationary may be based on data from the speed sensor 90 and/or the gear selector sensor 92. If the vehicle is not stationary, then the method or iteration of the method may end at block 102. If the vehicle is stationary, then the method may continue at block 106. It is also contemplated that block 104 may be omitted in one or more embodiments to facilitate raising or lowering of an axle assembly if the vehicle is not stationary. As such, block 100 may proceed to block 106 instead of block 104.

At block 106, one or more axle loads may be compared to an axle load threshold. An axle load may be based on data from a load sensor 94 that may support the vehicle 10. As such, an axle load may be determined for a non-liftable axle assembly 30 or a non-liftable axle assembly 30 and one or more liftable axle assemblies 32 that are not secured by the axle securing unit 80 and are supporting the vehicle 10. The axle load threshold may be a predetermined value that may be based on vehicle development testing. For example, the axle load threshold may be set at a predetermined value, such as 80% of a maximum load rating of the axle assembly. If the axle load or axle loads are not less than the axle load threshold (e.g., at least one of a non-liftable axle load and a liftable axle load is greater than or equal to a corresponding axle load threshold), then the method or method iteration may end at block 102. If an axle load is less than the axle load threshold (e.g., at least one of a non-liftable axle load and a liftable axle load is less than a corresponding axle load threshold), then the method may continue at block 108.

At block 108, one or more liftable axle assemblies 32 may be selected to lift. A liftable axle assembly 32 may be manually or automatically selected. A liftable axle assembly 32 may be manually selected by an operator or based on a user input that may be provided via the operator communication device 96. For example, the operator communication device 96 may permit an operator to select one or more liftable axle assemblies 32 to lift and secure. A liftable axle assembly 32 may be automatically selected by the control system 18. For example, the control system 18 may automatically select a single available liftable axle assembly 32 when the axle load on the non-liftable axle assembly 30 does not exceed the axle load threshold. If more than one liftable axle assembly 32 is available to lift, then the method may determine whether to secure one or more liftable axle assemblies 32 based on load data from one or more load sensors 94. For example, if there are two liftable axle assemblies 32 and one non-liftable axle assembly 30 and none of the liftable axle assemblies 32 are secured with a corresponding axle securing unit 80, then the two liftable axle assemblies 32 and one non-liftable axle assembly 30 support the weight of the vehicle 10. As such, the load sensors 94 associated with each axle assembly may detect an axle load. The total axle load or the maximum axle load may be compared to additional axle load thresholds or may be used to reference data in a lookup table to determine whether one or more liftable axle assemblies 32 may be lifted. As an example, two liftable axle assemblies 32 may be selected to lift when the maximum axle load detected is less than 50% of an associated maximum axle load rating. One liftable axle assembly 32 may be selected to lift when the maximum axle load detected is between 50% and 80% of an associated maximum axle load rating. These values and ranges are examples and it is contemplated that additional or different values or ranges may be provided depending on the number of axle assemblies and the configuration of the vehicle.

At block 110, the chassis 20 may be lowered. The chassis 20 may be lowered by deflating the air spring or air springs 58 associated with one or more suspension units 50 which in turn may retract those suspension units 50 toward the chassis 20. An air spring 58 may be deflated by venting pressurized gas to the surrounding environment as previously described. In at least one embodiment, all air springs 58 of the tractor 12 and the trailer 14 except for those provided with the front steering axle assembly of the tractor 12 may be deflated when the vehicle 10 includes a tractor 12 and a trailer 14. Similarly, all air springs 58 of the tractor 12 except for those provided with front steering axle assembly may be deflated when the vehicle 10 includes a tractor 12 without a trailer 14. Lowering of the chassis 20 is best shown by comparing FIG. 5 to FIG. 6. In FIG. 6, the air springs 58 of the non-liftable axle assembly 30 and the liftable axle assembly 32 are deflated, thereby allowing the associated suspension units 50 to retract or move toward a retracted position in which the suspension arm 52 may pivot about the pivot pin 60 and move closer to the chassis 20.

At block 112, the selected liftable axle assembly or assemblies 32 may be secured with the axle lift system 16. Securing of a liftable axle assembly 32 is best shown in FIG. 7. In FIG. 7, the actuator 86 of the axle lift system 16 may move the hook 84 into engagement with the liftable axle assembly 32 to hold the liftable axle assembly 32 in the secured position.

At block 114, the chassis 20 may be raised. The chassis 20 may be raised by inflating the deflated air springs 58 of the suspension units 50 of the axle assemblies that are not secured by an associated axle securing unit 80. As such, the air springs 58 of the non-liftable axle assembly or assemblies 30 that were deflated and the air springs 58 of the liftable axle assemblies 32 that were deflated but are not currently secured by an associated axle securing unit 80 may receive pressurized gas and may be inflated. Inflation of the air springs 58 may extend the suspension units 50 and may move the chassis 20 away from the support surface 40 and may lift the secured liftable axle assemblies 32 away from the support surface 40 such that the wheel assemblies 34 and tires 36 of the secured liftable axle assemblies 32 may disengage the support surface 40 and not support the vehicle 10. An illustration of raising of the chassis 20 is best shown in FIG. 8. In FIG. 8, the air spring 58 of the non-liftable axle assembly 30 is inflated while the air spring 58 of the liftable axle assembly 32 that is held in the secured position by the axle lift system 16 is not inflated. Inflation of the air spring 58 of the non-liftable axle assembly 30 causes the chassis 20 and the liftable axle assembly 32 to move away from the support surface 40, thereby allowing the tire or tires 36 of the secured liftable axle assembly 32 to lift away from and disengage the support surface 40. Lifting of one or more liftable axle assemblies 32 may help improve vehicle fuel economy by reducing or eliminating frictional drag forces between one or more tires 36 and the support surface 40 that may otherwise be present if the tires 36 remained in engagement with the support surface 40.

Referring to FIG. 4, a flowchart is shown that illustrates steps associated with releasing a liftable axle assembly 32 from the secured position. Releasing a liftable axle assembly 32 from a secured position generally reverses many of the method steps shown in FIG. 3. The steps associated with this flowchart will be described beginning with the vehicle 10 in the configuration shown in FIG. 8.

At block 200, the method may determine whether any liftable axle assemblies 32 are lifted or held in a secured position by an associated axle securing unit 80. If no liftable axle assemblies are lifted (e.g., no liftable axle assembly 32 is secured by an associated axle securing unit 80), then the method or method iteration may end at block 202. If at least one liftable axle assembly is lifted (e.g., at least one liftable axle assembly 32 is secured by an associated axle securing unit 80), then the method may continue at block 204.

At block 204, the method may determine whether the vehicle 10 is stationary as previously discussed with respect to block 104. If the vehicle is not stationary, then the method or iteration of the method may end at block 202. If the vehicle is stationary, then the method may continue at block 206. It is also contemplated that block 204 may be omitted in one or more embodiments to facilitate raising or lowering of an axle assembly if the vehicle is not stationary. As such, block 200 may proceed to block 206 instead of block 204.

At block 206, one or more axle loads may be compared to an axle load threshold. An axle load may be based on data from one or more load sensors 94 as previously described. The axle load threshold may be a predetermined value as previously described. If the axle load or axle loads are less than or equal to the axle load threshold, then the method or method iteration may end at block 202. If an axle load exceeds the axle load threshold, then the method may continue at block 208.

At block 208, one or more liftable axle assemblies 32 may be selected to release. A liftable axle assembly 32 may be manually or automatically selected. A liftable axle assembly 32 may be manually selected by an operator as previously discussed. A liftable axle assembly 32 may be automatically selected by the control system 18. For example, the control system 18 may automatically select a single available liftable axle assembly 32 for release when the axle load on the non-liftable axle assembly 30 is greater than the axle load threshold. If more than one liftable axle assembly 32 is available to release, then the method may determine whether to release one or more liftable axle assemblies 32 based on load data from one or more load sensors 94. For example, if there are two liftable axle assemblies 32 and one non-liftable axle assembly 30 and both of the liftable axle assemblies 32 are secured with a corresponding axle lift system 16, then the one non-liftable axle assembly 30 supports the weight of the vehicle 10. As such, the load sensor 94 associated with the non-liftable axle assembly 30 may detect an axle load. The axle load may be compared to one or more axle load thresholds or may be used to reference data in a lookup table to determine whether one or more liftable axle assemblies 32 may be released. As an example, two liftable axle assemblies 32 may be selected for release when the axle load detected is greater than 80% of an associated maximum axle load rating. One liftable axle assembly 32 may be selected for release when the axle load detected is between 50% and 80% of an associated maximum axle load rating. These values and ranges are examples and it is contemplated that additional or different values or ranges may be provided depending on the number of axle assemblies and the configuration of the vehicle.

At block 210, the chassis 20 may be lowered by deflating the air springs 58 associated with one or more suspension units 50 as previously discussed with respect to block 110. As such, the chassis 20 may move from the position shown in FIG. 8 to the position shown in FIG. 7.

At block 212, the selected liftable axle assembly or assemblies 32 may be released by the axle lift system 16. The axle lift system 16 may release one or more liftable axle assemblies 32 by moving the hook 84 out of engagement with a selected liftable axle assembly 32. Releasing a liftable axle assembly 32 is best shown in FIG. 6.

At block 214, the chassis 20 may be raised. The chassis 20 may be raised by inflating the air springs 58 of the suspension units 50 of the axle assemblies that are deflated and are not secured by an associated axle securing unit 80. Raising of the chassis 20 is best shown in FIG. 5.

Inflation of the air springs 58 may move the chassis 20 away from the support surface 40 and may lift any remaining secured liftable axle assemblies 32 away from the support surface 40 such that the wheel assemblies 34 and tires 36 of the secured liftable axle assembly or assemblies 32 may disengage the support surface 40 and not support the vehicle 10. Released liftable axle assemblies 32 may remain on the support surface 40 and may support the vehicle 10. The release of a liftable axle assembly 32 may provide additional axle assemblies to support vehicle loads and may help avoid exceeding maximum axle load ratings and/or may help better distribute loads between multiple axle assemblies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling an axle lift system for a vehicle comprising:
   providing a first axle assembly that is coupled to a chassis via a first suspension unit and that has a first tire;
   providing a second axle assembly that is coupled to the chassis via a second suspension unit and that has a second tire;
   retracting the first suspension unit and the second suspension unit to lower the chassis;
   holding the second axle assembly in a secured position with an axle securing unit; and
   extending the first suspension unit to raise the chassis such that the second tire does not support the vehicle.

2. The method of claim 1 wherein the first suspension unit and the second suspension unit are retracted to lower the chassis based on an operator command.

3. The method of claim 1 wherein the first suspension unit and the second suspension unit are retracted to lower the chassis when at least one of a first axle load and a second axle load is less than a corresponding axle load threshold.

4. The method of claim 1 wherein the first tire and the second tire support the vehicle before raising the chassis.

5. The method of claim 1 wherein the first suspension unit and the second suspension unit are retracted when the vehicle is stationary.

6. The method of claim 1 wherein retracting the first suspension unit and the second suspension unit further comprises deflating an air spring of the first suspension unit and deflating an air spring of the second suspension unit.

7. The method of claim 1 wherein the axle securing unit includes a hook that engages the second axle assembly to inhibit movement of the second axle assembly away from the chassis.

8. The method of claim 1 wherein raising the chassis includes inflating an air spring of the first suspension unit and not inflating an air spring of the second suspension unit.

9. The method of claim 1 wherein the first suspension unit and the second suspension unit are retracted when the first tire and the second tire are both disposed on a support surface and support the vehicle.

10. A method of controlling an axle lift system for a vehicle comprising:
    providing a first axle assembly that is coupled to a chassis via a first suspension unit and that has a first tire that supports the vehicle;
    providing a second axle assembly that is coupled to the chassis via a second suspension unit and that has a second tire, wherein an axle securing unit holds the second axle assembly in a secured position such that the second tire does not support the vehicle;
    retracting the first suspension unit to lower the chassis;
    releasing the axle securing unit from the second axle assembly; and
    extending the first suspension unit and the second suspension unit to raise the chassis such that the first tire and the second tire both support the vehicle.

11. The method of claim 10 wherein the first suspension unit is retracted to lower the chassis based on an operator command.

12. The method of claim 10 wherein the first suspension unit is retracted to lower the chassis when a first axle load exceeds an axle load threshold.

13. The method of claim 10 wherein the axle securing unit is released when the first tire and the second tire are disposed on a support surface to support the vehicle.

14. The method of claim 10 wherein the first suspension unit is retracted when the vehicle is stationary.

15. The method of claim 10 wherein retracting the first suspension unit further comprises deflating an air spring of the first suspension unit.

\* \* \* \* \*